3,421,916
VITREOUS CERAMIC COMPOSITIONS
Masanari Mikoda, Hirakata-shi, Tadashi Hikino, Takatsuki-shi, and Takayuki Kuroda, Moriguchi-shi, Osaka, Japan, assignors to Matsushita Electric Industrial Co., Ltd., Osaka, Japan
No Drawing. Filed Aug. 20, 1965, Ser. No. 481,407
Claims priority, application Japan, Oct. 23, 1964, 39/60,703
U.S. Cl. 106—53          3 Claims
Int. Cl. C03c 3/04

ABSTRACT OF THE DISCLOSURE

Addition of 2–8 mol percent $PbF_2$ to a glass composition consisting essentially of 50–65 silica; 15–25 lead oxide; 5–15 mol percent total of the alkali metal oxides; potassium oxide and/or lithium oxide and/or sodium oxide; 5–15 mol percent total of one or more of magnesium oxide, strontium oxide and calcium oxide; and 1–15 mol percent boric oxide produces a composition of good sinterability at, e.g., about 600°, high electrical insulation resistance and low dissipation factor, the dielectric constant of the composition being stable over the range from −55° C. to 125° C. The devitrification temperature is much lower than that of a composition containing PbO in lieu of $PbF_2$. The new composition is especially suitable for use in capacitors.

---

The present invention relates to novel ceramic compositions and more particularly to novel glass compositions having extremely excellent electrical properties, whereby they are especially suitable for use in capacitors.

Vitreous ceramic compositions based on silica have been widely used in electrical capacitors because of their highly stable electrical properties even at the high temperature of 200° C. The characteristics required for vitreous capacitors are low dissipation factor and high electrical insulation resistance. Recently, an advance in the electronics industry has required more stable electrical properties in capacitors to enable them to be used at high temperatures.

It is known that there exist two types of glass capacitors: One is made of a combination of glass thin foils and aluminum foils and the other is made of thin layers of sintered glass powder and silver electrodes. The latter is becoming popular for a highly reliable capacitor provided with low dissipation factor at high temperatures, and its improvement in electrical characteristics is an object of the present invention.

An important characteristic of glass compositions for sintered type capacitors is sinterability at low temperatures of about 600° C. This is usually achieved by a high content of alkali metal oxide. However, the alkali metal ions in glass are known to migrate easily under electrical field and result in low electrical resistance of the glass. Replacement of silica with certain metal oxides also lowers the sintering temperature of the glass composition, but the resulting low content of silica has a tendency to result in devitrification of the glass, which usually reduces the electrical resistance. Accordingly, it is necessary that, in sintered type capacitors, devitrification be retarded during the sintering process.

According to the present invention, an addition of lead fluoride produces glass compositions which have good sinterability at low temperatures of about 600° C., high electrical insulation resistance and low dissipation factor, the dielectric constant of the said compositions being stable over a temperature range of −55° C. to 125° C. Another advantage of additive lead fluoride is a lower devitrification temperature which is much lower than that of compositions having the same amount of lead oxide or other divalent metal oxides in lieu of lead fluoride. Lowering the devitrification temperature increases the differences between sintering temperature and devitrification temperature and results in the retardation of devitrification. The addition of another fluoride compound instead of lead fluoride results in inferior electrical and sintering properties. For instance, the addition of sodium fluoride or potassium fluoride makes the dissipation factor higher at high temperatures, and the addition of calcium fluoride or lithium fluoride results in an intensive devitrification of the glass.

The compositions of the present invention consist essentially of silica; lead oxide; a combination of alkali metal oxides selected from the group consisting of potassium oxide, lithium oxide and sodium oxide; and one or more of the oxides of divalent metals selected from the group consisting of magnesium oxide, strontium oxide and calcium oxide; lead fluoride; and boric oxide. Each of the above components is a critical ingredient for the production of an excellent glass capacitor which has a high electric insulation resistance exceeding 100,000 MΩ at 125° C., and high electrical stability as indicated by a dissipation factor which is not greater than 0.001 at 20° C., 0.002 at 125° C., 0.004 at 200° C., at 1 Kc., respectively, after life testing for 72 hours at 50 v. at 200° C. Table 1 below sets forth the ingredients and their proportions. The proportion ranges are in terms of gram molecular percentages, as indicated.

TABLE 1

| Ingredient: | Mole percentages |
|---|---|
| Silica, $SiO_2$ | 50–65 |
| Lead oxide, PbO | 15–25 |
| Alkali metal oxide, $R_2O$ | 5–15 |
| Divalent metal oxide, RO | 5–15 |
| Lead fluoride, $PbF_2$ | 2–8 |
| Boric oxide, $B_2O_3$ | 1–15 |

Mole percentages of various ingredients have been based on the discovery of the present invention. The devitrification of the above specific compositions is promoted by an addition of silica in an amount lower than 50 mole percent or by the addition of lead fluoride in a higher amount than 8 mole percent. The sintering temperature of the compositions increases with an addition of silica in a higher amount than 65 mole percent, lead oxide in an amount lower than 15 mole percent, alkali metal oxides in an amount lower than 5 mole percent or lead fluoride in an amount lower than 2 mole percent. An addition of alkali metal oxides greater than 15 mole percent results in a low electrical insulation resistance and an inferior electrical stability in life testing. The migration of alkali metal ions is prevented by an addition of a suitable amount of lead oxide but chemical durability decreases with an addition of lead oxide higher than 25 mole percent. Effects of divalent metal oxides relate to high stability in electrical properties and are attained by addition of, at least, 5 mole percent, whereas addition of more than 15 mole percent thereof results in a low electrical resistance. Boric oxide has the effect of producing a well sintered vitreous layer and to elevate the electrical insulation resistance. Its suitable proportion range is from 1 mole percent to 15 mole percent.

A preferred intermediate range of proportions of the new compositions is the following.

TABLE 1a

| Ingredient: | Mole percentages |
| --- | --- |
| Silica, $SiO_2$ | 52.2–53.2 |
| Lead oxide, PbO | 17.8–18.8 |
| Strontium oxide, SrO | 2.7–3.7 |
| Magnesium oxide, MgO | 5.6–6.5 |
| Lithium oxide, $Li_2O$ | 2.0–2.6 |
| Sodium oxide, $Na_2O$ | 2.0–2.6 |
| Potassium oxide, $K_2O$ | 6.5–7.1 |
| Boric oxide, $B_2O_3$ | 4.5–5.4 |
| Lead Fluoride, $PbF_2$ | 3.0–4.0 |

This intermediate range composition has all the desired properties of the broader range compositions hereinbefore described.

According to the present invention, the combination of alkali metal oxides should be in a suitable mole ratio for an achievement of a high electrical resistance of the present compositions. The mole ratio of potassium oxide to sodium oxide desirably ranges from 2 to 5. When lithium oxide is added to a combination of potassium oxide and sodium oxide, the amount of lithium oxide should be such that the ratio of potassium oxide and sodium oxide to lithium oxide ($K_2O+Na_2O/Li_2O$) is higher than 1.

The following examples of specific new compositions are given by way of illustration and should not be construed as limitative.

A typical working example is as follows:

EXAMPLE

An intimate blend of 32.1 parts by weight of silica, 41.3 parts by weight of lead oxide, 2.4 parts by weight of magnesium oxide, 3.4 parts by weight of strontium oxide, 0.7 part by weight of lithium oxide, 1.4 parts by weight of sodium oxide, 6.5 parts by weight of potassium oxide, 8.7 parts by weight of lead fluoride and 3.5 parts by weight of boric oxide, all in finely powdered form, is heated to fusion. Any of the recited oxides may be replaced by the stoichiometrically equivalent amount of the corresponding carbonate or nitrate. The obtained homogeneous molten glass is then poured into water at ambient temperature and, finally, the so-obtained frit is ground into powder form, suitable for the manufacture of a vitreous enamel of the type hereinbefore described.

The vitreous compositions of the invention are used in the form of vitreous enamels comprising the powdered vitreous materials in a liquid vehicle such as ethyl cellulose. The vitreous enamel is applied by spraying technique and an electrode is made with silver paste by a silk screen method. This process consisting of spraying and squeegeeing is repeated for production of a given number of layers of vitreous enamel and electrode. After the laminated blocks are built up, they are dried and sintered at about 600° C. to 650° C. for 15 hours. Heating rate

TABLE 2.—CALCULATED COMPOSITION, MOLE PERCENTAGES

| Ingredients | Examples | | | | | | | | Prior Art 1 | Prior Art 2 |
| --- | --- | --- | --- | --- | --- | --- | --- | --- | --- | --- |
| | 1 | 2 | 3 | 4 | 5 | 6 | 7 | 8 | | |
| $SiO_2$ | 52.7 | 54.7 | 57.5 | 56.0 | 60.0 | 51.5 | 50.2 | 53.2 | 44.0 | 45.4 |
| PbO | 18.3 | 20.0 | 18.0 | 17.3 | 16.0 | 18.6 | 15.5 | 17.8 | 23.2 | 24.1 |
| MgO | 6.0 | 6.0 | 5.8 | 8.4 | 5.6 | 6.6 | 5.7 | 6.2 | 8.7 | 5.43 |
| SrO | 3.2 | | 3.0 | 3.1 | | 4.8 | 2.4 | 3.0 | 6.2 | 3.94 |
| CaO | | 2.5 | | | 1.0 | | | | | |
| $Li_2O$ | 2.3 | 2.0 | 2.0 | 1.6 | 1.0 | 1.7 | 1.0 | 2.0 | 2.3 | 2.39 |
| $Na_2O$ | 2.3 | 1.5 | 2.0 | 1.6 | 1.0 | 1.7 | 2.0 | 2.0 | 2.5 | 0.77 |
| $K_2O$ | 6.8 | 6.0 | 6.1 | 7.0 | 3.3 | 7.1 | 5.1 | 5.0 | 2.7 | 5.01 |
| $PbF_2$ | 3.5 | 4.0 | 4.6 | 3.5 | 6.7 | 5.0 | 4.0 | 5.2 | | |
| $B_2O_3$ | 4.9 | 3.2 | 1.0 | 1.5 | 5.4 | 3.0 | 14.2 | 5.6 | | 2.08 |
| $Al_2O_3$ | | | | | | | | | | |
| NaF | | | | | | | | | 10.4 | |

The vitreous compositions of prior art 1 and 2 as identified in Table II are those identified as "A" in Table III of U.S. Patent 2,413,549 and "1" Table II of U.S. Patent 3,106,474, respectively.

The vitreous ceramic compositions of the present invention are produced by weighing, dry blending and then melting the ingredients into a homogeneous fluid glass. The various reagents such as the oxides may be added to the batch composition stoichiometrically in the form of their carbonates or nitrates for purposes of cost, stability and convenience. The melting temperature is usually within the range of 1000 to 1200° C. in order that rapid homogenization of the melt may be achieved. The homogeneous molten vitreous compositions are fritted by pouring them into water, whereby solid particles or granules are produced. Next, these particles or granules are ground into a fine powder for the purpose of preparing them for subsequent use in the production of capacitors.

is about 100° C./hour or higher. Capacitors so prepared were subjected to life testing for 72 hours at 200° C. under the voltage stress of 50 volts. The dissipation factors and electrical insulation resistances were determined at 20° C., 125° C., and 200° C., before and after life testing. The results are set forth in Table 3 below. The capacitances of samples listed in Table 3 were nearly 200 pf. As is evident from Table 3, the compositions of the present invention have a low dissipation factor and a high insulation resistance even at 200° C. After 72 hours of life testing, the compositions of the present invention also exhibit exceptionally low dissipation factors at 200° C. Although the literature has no available data about the electrical properties of the typical prior art compositions as identified in Table 2 at high temperatures of about 200° C., it will be clearly understood from Table 3 that exceptionally stable electrical properties at high temperatures can be attained by the compositions of the present invention.

TABLE 3

| Examples | Before life testing | | | | After life testing | | | |
| --- | --- | --- | --- | --- | --- | --- | --- | --- |
| | I.R. at 125° C. (MΩ) | D.F. at 1 kc., 20° C. | D.F. at 1 kc., 125° C. | D.F. at 1 kc., 200° C. | I.R. at 125° C. (MΩ) | D.F. at 1 kc., 20° C. | D.F. at 1 kc., 125° C. | D.F. at 1 kc., 200° C. |
| 1 | 2,000,000 | 0.0003 | 0.0014 | 0.0030 | 1,700,000 | 0.0004 | 0.0015 | 0.0035 |
| 2 | 1,500,000 | 0.0003 | 0.0014 | 0.0033 | 1,500,000 | 0.0005 | 0.0015 | 0.0033 |
| 3 | 2,000,000 | 0.0003 | 0.0016 | 0.0036 | 1,700,000 | 0.0003 | 0.0016 | 0.0038 |
| 4 | 1,900,000 | 0.0004 | 0.0017 | 0.0032 | 1,700,000 | 0.0005 | 1.0017 | 0.0036 |
| 5 | 1,700,000 | 0.0004 | 0.0014 | 0.0030 | 1,600,000 | 0.0004 | 0.0015 | 0.0033 |
| 6 | 2,100,000 | 0.0003 | 0.0015 | 0.0032 | 2,000,000 | 0.0003 | 0.0017 | 0.0034 |
| 7 | 1,200,000 | 0.0003 | 0.0018 | 0.0036 | 1,100,000 | 0.0006 | 0.0018 | 0.0037 |
| 8 | 2,100,000 | 0.0003 | 0.0013 | 0.0034 | 1,800,000 | 0.0004 | 0.0016 | 0.0038 |
| Prior art 1 | | *0.0005 | 0.0050 | | | *0.0110 | | |
| Prior art 2 | | *0.00035 | 0.0022 | | | *0.0005 | | |

I.R.=Electrical insulation resistance; D.F.=Dissipation factor.
*The measurement was carried out at 25° C.

What is claimed is:

1. A vitreous ceramic composition having a dielectric constant which is stable over a temperature range of −55° C. to 125° C., and having a dissipation factor no greater than 0.001 at 20° C., 0.002 at 125° C., 0.004 at 200° C., at 1 kc., respectively, after the composition is tested at 200° C. under a voltage stress of 50 volts for 72 hours, said composition consisting essentially of the following ingredients in the following approximate mole percentages: 50 to 65% silica, 15 to 25% lead oxide, 5 to 15% divalent metal oxide selected from the group consisting of strontium oxide, magnesium oxide and calcium oxide, 2 to 8% lead fluoride, 1 to 15% boric oxide, 5 to 15% of a mixture of alkali metal oxides selected from the group consisting of potassium oxide, lithium oxide and sodium oxide, the molar ratio of potassium oxide to sodium oxide being from 2 to 5, and the molar ratio of potassium oxide and sodium oxide to lithium oxide ($K_2O+Na_2O/Li_2O$) being greater than 1.

2. A vitreous ceramic composition having a dielectric constant which is stable over a temperature range of −55° C. to 125° C., having a dissipation factor no greater than 0.001 at 20° C., 0.002 at 125° C., 0.004 at 200° C., at 1 kc., respectively, after the composition is tested at 200° C., under a voltage stress of 50 volts for 72 hours, and also having a low sintering temperature of about 600° C., said composition consisting of the following ingredients in the following approximate mole percentages: 52.2 to 53.2% silica, 17.8 to 18.8% lead oxide, 2.7 to 3.7% strontium oxide, 5.5 to 6.5% magnesium oxide, 3.0 to 4.0 lead fluoride, 4.4 to 5.4% boric oxide, 2.0 to 2.6% lithium oxide, 2.0 to 2.6% sodium oxide, and 6.5 to 7.1% potassium oxide.

3. A vitreous ceramic composition having a dielectric constant which is stable over a temperature range of −55° C. to 125° C., having a dissipation factor no greater than 0.001 at 20° C., 0.002 at 125° C., 0.004 at 200° C. at 1 kc., respectively, after the composition is tested at 200° C. under a voltage stress of 50 volts for 72 hours, and also having a low sintering temperature of about 600° C., said composition consisting of the following ingredients in the following approximate mole percentages: 52.7% silica, 18.3% lead oxide, 3.2% strontium oxide, 6.0% magnesium oxide, 3.5% lead fluoride, 4.9% boric oxide, 2.3% lithium oxide, 2.3% sodium oxide and 6.8% potassium oxide.

References Cited

UNITED STATES PATENTS 2,393,448  1/1946  Armistead _____ 106—53
3,106,474  10/1963  Glabau _____ 106—53

TOBIAS E. LEVOW, *Primary Examiner.*

R. D. EDMOND, *Assistant Examiner.*

U.S. Cl. X.R.

252—63.5